March 5, 1957  L. R. KAHN  2,784,311
SUPPRESSED-CARRIERS RECEPTION
Filed March 21, 1952  3 Sheets-Sheet 1

INVENTOR.
LEONARD R. KAHN
BY
ATTORNEYS

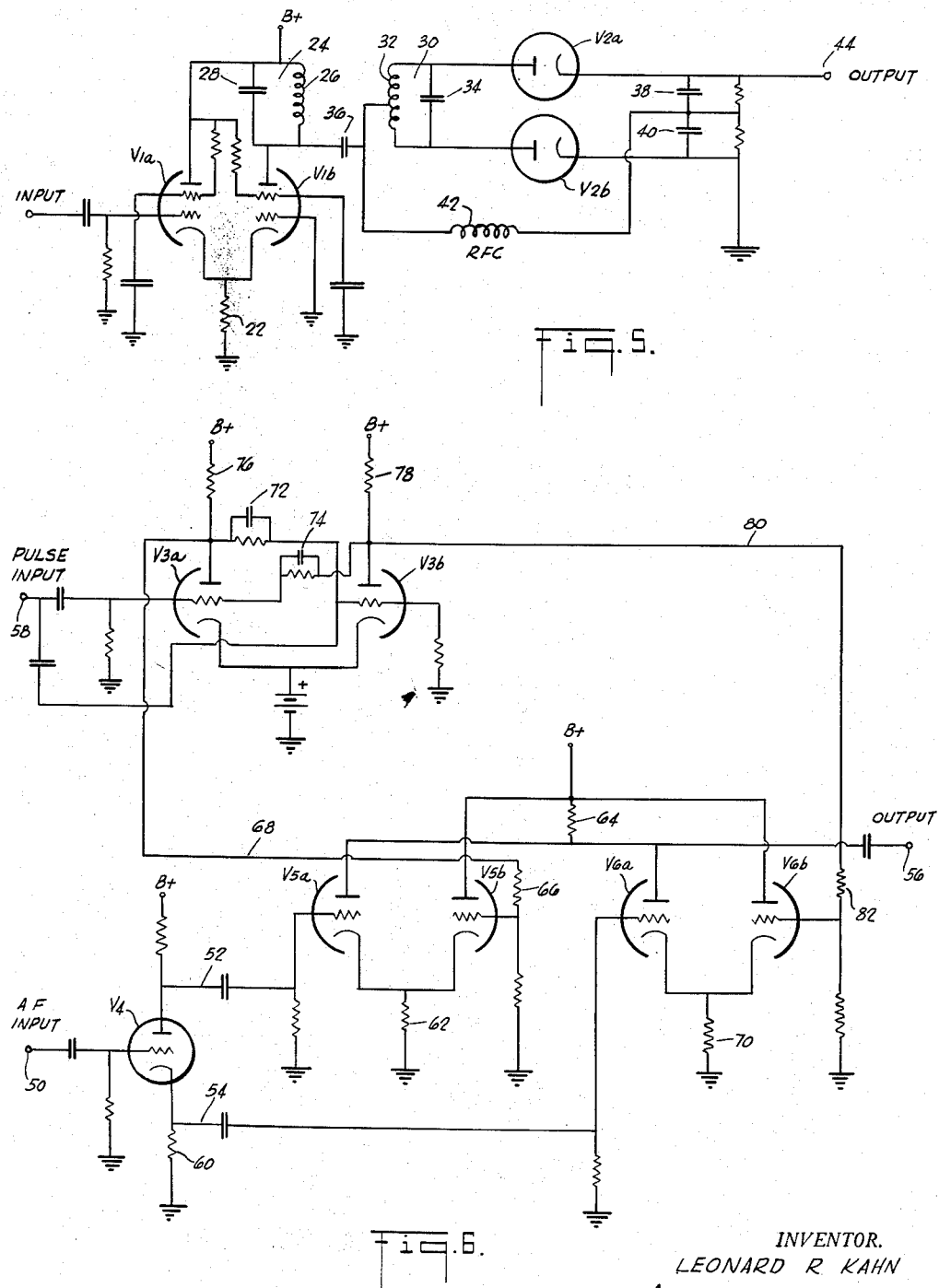

March 5, 1957 L. R. KAHN 2,784,311
SUPPRESSED-CARRIERS RECEPTION
Filed March 21, 1952 3 Sheets-Sheet 3

INVENTOR.
LEONARD R. KAHN
BY *James and Franklin*
ATTORNEYS

United States Patent Office
2,784,311
Patented Mar. 5, 1957

2,784,311

SUPPRESSED-CARRIER RECEPTION

Leonard R. Kahn, New York, N. Y., assignor to Crosby Laboratories, Inc., Mineola, N. Y., a corporation of New York Application March 21, 1952, Serial No. 277,847

14 Claims. (Cl. 250—27)

This invention relates to the reception of radio waves, especially amplitude-modulated waves, and more particularly to the reception of double-sidebands after carrier suppression.

The envelope wave shape of a double-sideband suppressed-carrier signal contains no components of fundamental carrier frequency. Therefore if normal diode detection is attempted the resulting output is badly distorted. The prevailing method of receiving double-sideband suppressed-carrier signals requires the addition of the carrier ahead of the detector. The resulting wave then fed to the detector is an amplitude-modulated signal with full carrier present. This system requires means to supply a carrier wave having precisely controlled frequency and phase. It is virtually impossible to supply such a carrier without control from the transmitter, and the usual practice therefore is to transmit a small component of the carrier, instead of fully suppressing the carrier. At the receiver this component is selected by narrow filters, and then amplified to a strength greater than the combined amplitude of the sidebands. Such a receiver is sometimes called "an exalted carrier receiver." However, even with this system the technical and performance requirements of the carrier filter, and the frequency stability requirements of the carrier amplifier and associated equipment, are very severe.

The primary object of the present invention is to provide a suppressed-carrier signal receiver which does not require the introduction of an exalted or accentuated carrier, and a corollary object is to dispense with the need for transmitting a small component of the carrier at the transmitter, thus making possible full suppression of the carrier.

If the envelope wave shape of a double-sideband suppressed-carrier signal be examined it will be seen that the enevelope wave is reversed in polarity whenever the wave goes through zero. At these instants the radio frequency wave suddenly reverses in phase. In accordance with a feature and object of my invention, these phase reversals may be used to reverse the polarity of the output of an amplitude-modulation detector. More specifically, the double-sideband suppressed-carrier signal is passed through an amplitude-modulation detector, the output of which may be repeatedly reversed in polarity by an appropriate electronic reversing switch, and the aforesaid phase reversals of the radio frequency wave are employed to operate the switch and thus reverse the polarity of the detector output or audio frequency signal. This eliminates the distortion which otherwise would be caused by the envelope wave swinging past the zero axis because of the absence of the carrier, and reproduces the desired undistorted output.

Another object of the invention is to provide appropriate and preferred apparatus for effectuating the method of my invention.

Still another object is to provide a receiver system which may be used with a radio wave in which carrier suppression is not deliberately intended, but which suffers from overmodulation distortion. A still further object is to provide a system which is less sensitive to jamming than the conventional exalted carrier receiver in which the residual carrier is filtered, separately amplified, and reintroduced prior to detection.

Still another object is to provide a secrecy system in which the carrier frequency at the transmitter is varied in either periodic or random fashion, thus creating much difficulty for an intercepting receiver of the exalted carrier type, without, however, materially affecting the receiver of my invention.

To accomplish the foregoing general objects, and other more specific objects which will hereinafter appear, my invention resides in the method and apparatus elements, and their relation one to another, as are more particularly described in the following specification. The specification is accompanied by drawings, in which.

Figure 4:
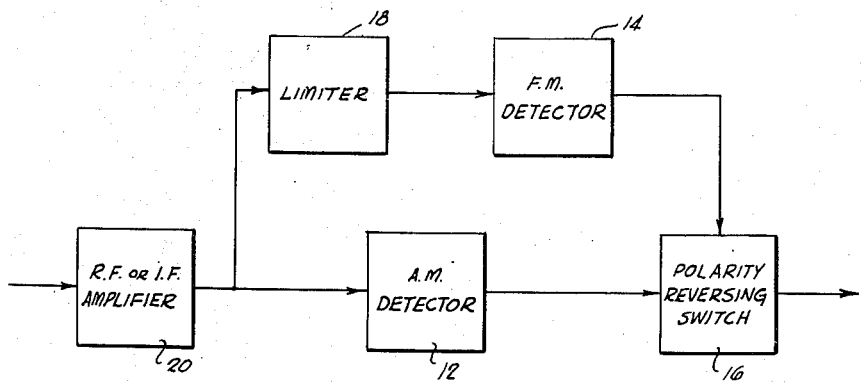
Figure 7:
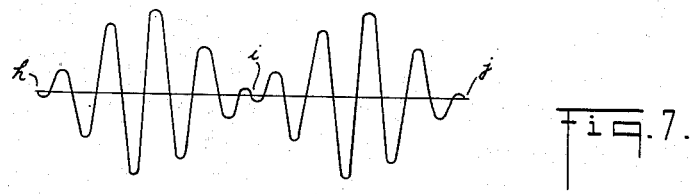
Figure 8:
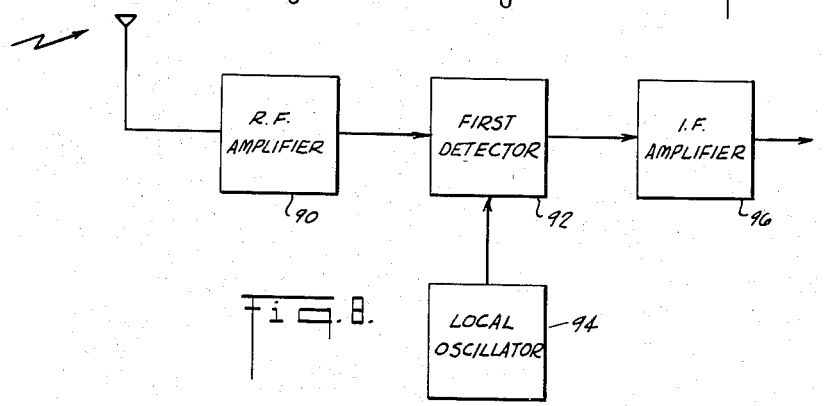

Fig. 4 schematically illustrates a receiver system embodying features of my invention;

Fig. 5 is a wiring diagram for one form of the limiter and phase detector indicated in Fig. 4;

Fig. 6 is a wiring diagram for one form of the polarity reversing switch indicated in Fig. 4;

Fig. 7 is explanatory of the operation of one part of the system;

Fig. 8 is a block diagram supplemental to that shown in Fig. 4; and

Figure 9:
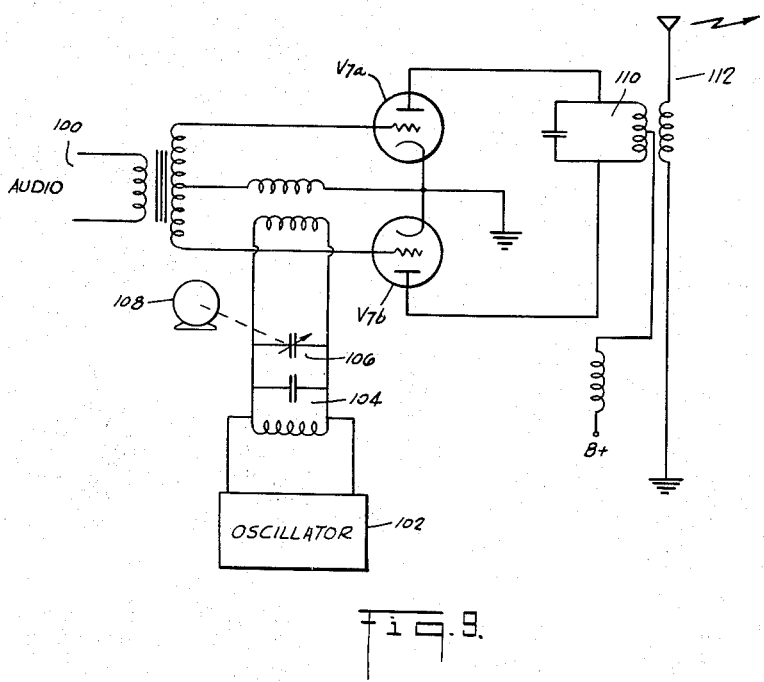

Fig. 9 illustrates schematically a transmitter which may be used for secrecy signalling.

Figure 1:
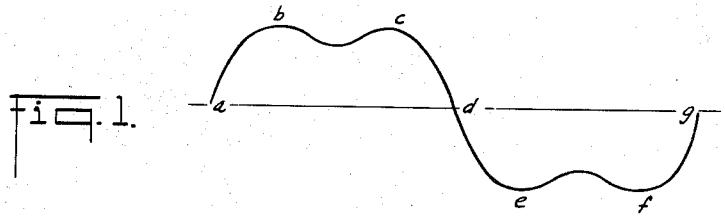
Fig. 1 represents one cycle of a typical audio frequency signal.
Figure 2:
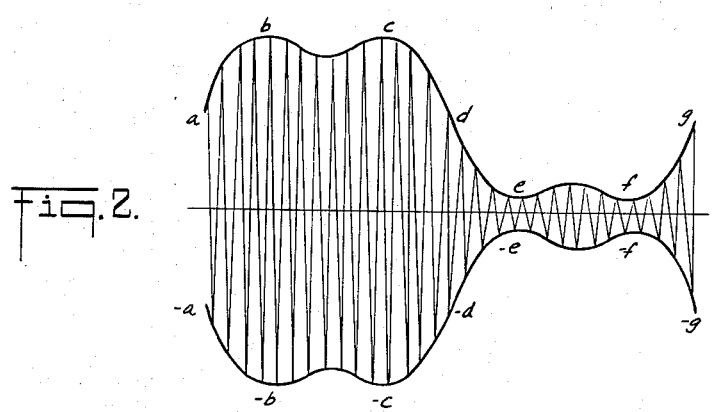
Fig. 2 represents a radio frequency wave, amplitude modulated by the signal shown in Fig. 1.

Referring to the drawings, and more particularly to Fig. 1, the audio frequency signal there represented has a positive cycle indicated at $a$, $b$, $c$, $d$, and a negative cycle indicated at $d$, $e$, $f$, $g$. The upper envelope of the modulated carrier shown in Fig. 2 is identical, but, of course, is displaced to one side only of the zero axis, that is, even the low points $e$ and $f$ are located above the zero axis, while the corresponding points $-e$ and $-f$ are located below the zero axis.

When the carrier is fully removed the envelope again straddles the zero axis, so that the part $d$, $e$, $f$, $g$ of the envelope is below the zero axis, and the part $d$, $-e$, $-f$, $g$ is above the zero axis, instead of vice versa. If this wave were detected or rectified the resulting audio frequency signal would take the from $a$, $b$, $c$, $d$, $-e$, $-f$, $g$, which is altogether different from the intended form $a$, $b$, $c$, $d$, $e$, $f$, $g$. The output would be fully distorted. The principle underlying my invention is to pass this extremely distorted output through a polarity reversing switch, and to so operate the switch that the detected output is not reversed between the points $a$ and $d$, but is reversed between the points $d$ and $g$ (or vice versa), thus flipping part of the rectified wave form from the incorrect position $d$, $-e$, $-f$, $g$ to the correct and desired position $d$, $e$, $f$, $g$. This is repeated for each of the succeeding audio frequency cycles. In this way the distorted output is restored to its original or desired undistorted condition.

To operate the polarity reversing switch at the crossover points $a$, $d$, $g$, etc., I take advantage of the fact that the radio frequency wave suddenly reverses in phase when the envelope crosses the zero axis. The fact that two equal tones when combined with phase reversals create pips of frequency modulation can be understood by drawing a curve of the phase of the resultant vector of the two tones, and differentiating it with respect to time in order to get the frequency modulation component. This has been done by Corrington in his article on "Frequency Modulation Distortion Caused by Common and Adjacent Channel Interference" which was published in the RCA Review for December 1946. In Figs. 7 and 8 of this article, curves are shown representing the pulse output of a frequency modulation detector when fed two different frequency components. It should be noted that if the higher frequency component is larger than the lower frequency component, the polarity of the pulse will be different from what it would be if the lower frequency component were the larger. Therefore the polarity switching device preferably should be sensitive to both positive and negative pulses.

As one way of showing the phase reversal employed in the present invention, reference may be made to Fig. 7. The envelope crosses the zero axis at the points $h$, $i$ and $j$, and it will be noted that at the point $i$ there is a sudden reversal of phase and an instantaneous change of frequency. This is used to trigger the polarity reversing switch which follows the regular amplitude-modulation detector. Similar remark applies to the points $h$ and $j$.

A system using my invention is schematically shown in block form in Fig. 4, referring to which the amplitude-modulated suppressed-carrier sidebands are rectified or detected in a suitable detector 12. A part of the input wave is supplied to a suitable frequency discriminator or detector 14, and this is arranged to generate a pulse each time the received wave reverses in phase. The detector 14 is preferably a frequency modulation detector or discriminator, although a phase detector and differentiating circuit might be used. The resulting pulses are used to trigger a polarity reversing switch 16, and thus to reverse the phase or polarity of the output from detector 12. More specifically, the frequency modulation detector 14 generates a pulse of one polarity when the high frequency wave reaches zero and abruptly reverses phase in one direction, and it generates a pulse of opposite polarity when the high frequency wave reaches zero and abruptly reverses phase in the opposite direction. The polarity reversing switch 16 delivers the detector output successively in one polarity and then the other.

The detector 14 is preferably preceded by a limiter 18, and this is of the type arranged to limit both positive and negative half cycles. The detector 12 and limiter 18 may, of course, be preceded by a suitable amplifier 20, and in the present case this is indicated to be an intermediate frequency amplifier because the system is assumed to be a superheterodyne system in which the transmitted wave is of still higher frequency, and may be appropriately amplified and reduced in frequency to a more convenient intermediate frequency by using a local oscillator and a first detector, the intermediate frequency then being selectively amplified in the amplifier 20, and the detector 12 acting as a second detector.

This is shown in the block diagram of Fig. 8 in which the received signal is amplified in a high frequency amplifier 90, the output of which is fed to a first detector 92 where it is mixed with the output of a local oscillator 94. This heterodynes the received signal down to a lower radio frequency which is supplied to an intermediate frequency amplifier 96, which, in a superheterodyne system, would correspond to the amplifier 20 shown in Fig. 4. Thus, the transmitted wave, depending on its frequency, may be supplied to the amplifier 20 either directly or after heterodyning. However, the intermediate frequency still is a high or radio frequency, compared to the modulation or audio frequency.

A specific circuit for the limiter 18 and the detector 14 is shown in Fig. 5 of the drawing. The tubes V1a and V1b act as a limiter. The limiter is preferably of the type fully described in U. S. patent to Murray G. Crosby, No. 2,276,565 issued March 17, 1942. This limiter therefore requires no detailed description here, but briefly, the tube V1a has its anode connected directly to the "B" supply, and the tube V1b has its grid connected to ground, so that both remain at fixed potentials. The tubes have a common cathode resistor 22. When the grid of tube V1a goes positive the potential of the cathode of tube V1b is raised and the tube V1b cuts off, thus limiting the output from the tube V1b to the tuned circuit 24. This limiting action takes place at a desired point regardless of how much further the grid of tube V1a goes positive. When the grid of tube V1a goes negative the potential of the cathode of the tube V1b is lowered and tube V1b conducts. Tube V1a cuts off at a desired point, and no further change takes place thereafter no matter how much more negative its grid is swung. The output of tube V1b depends on the circuit parameters and the potential applied, and is independent of the amplitude of the wave applied to the grid of tube V1a. Thus the output supplied to the tuned circuit 24 is limited in respect to both the positive half cycles and the negative half cycles.

The frequency modulation detector or discriminator may be of the general type disclosed in U. S. patent to Stuart W. Seeley, No. 2,121,103 issued June 21, 1938. Such a frequency modulation detector comprises essentially a resonant circuit 24 having inductor 26 and capacitor 28, and a resonant circuit 30 having inductor 32 and capacitor 34, the resonant circuits 24 and 30 being both tuned to the frequency of the suppressed carrier. The inductors 26 and 32 are loosely coupled, so that there is a substantially 90° change in phase between the circuits. One side of the primary resonant circuit 24 is coupled by means of a large blocking condenser 36 to an intermediate point, usually the midpoint, of inductor 32. The condenser 36 has negligible reactance, and causes no significant change in phase. Thus the voltages may be represented by three vectors drawn at right angles when the frequency corresponds to the carrier frequency. However, upon frequency variation the opposed vectors corresponding to voltages induced in the upper and lower halves of coil 32 rotate somewhat in one direction or the other relative to the vector corresponding to the voltage passing through the blocking capacitor 36, and this results in unequal outputs from the rectifiers V2a and V2b, which are connected to opposite sides of the secondary resonant circuit 30. The condensers 38 and 40 are bypass condensers for radio frequency, and a radio frequency choke 42 is preferably connected as shown. The output at 44 corresponds to the frequency modulation of the carrier, and in the case here described, to the phase reversals in the received radio signal.

That is, in the present case the frequency modulation is essentially only the abrupt change of instantaneous radio frequency indicated schematically at the crossover points $h$, $i$, and $j$ in Fig. 7. Thus the frequency discriminator circuit of Fig. 5 delivers either a brief positive pulse, or a brief negative pulse, at the said crossover points.

A circuit for the polarity reversing switch 16 of Fig. 4, which switch responds to the aforesaid pulses, is shown in Fig. 6 of the drawing. This comprises circuit elements centering about the tube V4 and connected at input terminal 50 to the amplitude-modulation detector. There is a lead 52 for delivering a reversed-phase output, and also a lead 54 for delivering an in-phase output. The circuit further comprises switch means to transmit either the reverse-phase output or the in-phase output, in alternation. More specifically, there is an electron tube V5a acting as a switch to transmit or cut off the reversed-phase output from lead 52, and there is another tube V6a acting as a switch to transmit or cut off the in-phase output from lead 54. These outputs are combined at output terminal 56.

The arrangement of Fig. 6 also includes a triggering circuit utilizing the tubes V3a and V3b, with an associated network which is stable with either tube conducting and the other cut off. The positive and negative pulses delivered by the phase detector of Fig. 5 are supplied to terminal 58, and led to the grid of tube V3a, thus making this tube either conductive or non-conductive, and at the same time making the tube V3b either non-conductive or conductive. This triggering circuit is appropriately coupled to the switch tubes to make one or the other conductive, and thus to supply either the reversed phase or in-phase modulation to the output connection 56.

Considering the circuit in greater detail, the amplitude-modulation detector output is supplied from connection 50 to the amplifier tube V4, and inasmuch as the connection 52 is from the plate of the tube, there is a reversal of phase or detected signal polarity across the tube. The lead 54, however, is connected to the cathode of the tube above a cathode resistor 60, thus providing a so-called "cathode follower" connection, which provides an in-phase potential. The reversed-phase output is led to the grid of the switch tube V5a, while the in-phase output is led to the grid of the other switch tube V6a.

Switch tube V5a is controlled by a companion tube V5b, both of which have a common cathode resistor 62. The plate of tube V5a is connected to the "B" voltage supply through a load resistor 64, while the plate of tube V5b is connected directly to the "B" voltage source without any load resistor. On reflection it will be evident that when tube V5b is made conductive the IR drop across resistor 62 will make the tube V5a non-conductive, thus cutting off the reverse-phase output from reaching the delivery terminal 56. On the other hand when the tube V5b is made non-conductive, the tube V5a is made conductive, thus delivering the reversed-phase output to the terminal 56.

The switch tube V6a and its companion control tube V6b are similarly arranged, that is, they have a common cathode resistor 70, and when the control tube V6b is conductive the switch tube V6a is cut off, and conversely, when the control tube V6b is non-conductive the switch tube V6a is conductive, and supplies in-phase output from the lead 54 to the delivery terminal 56.

The triggering circuit centering about tubes V3a and V3b may be a standard triggering circuit such as that described on page 850 of "Electronic Circuits and Tubes" by the Cruft Electronics Staff and published by McGraw-Hill. This particular type of triggering circuit has the desired characteristic of being capable of switching in response to either positive or negative pulses.

Specifically, the anode of the tube V3a is connected through a grid leak condenser 72 to the grid of tube V3b, and the anode of tube V3b is similarly connected through a grid leak condenser 74 to the grid of tube V3a. The anodes are connected to the "B" voltage supply through load resistors 76 and 78. It will thus be evident that when tube V3a conducts, the potential at the anode is lowered, thereby cutting off the tube V3b, and this in turn raises the potential at the anode of tube V3b, thereby raising the potential of the grid of tube V3a, thus maintaining tube V3a conductive and tube V3b non-conductive. On the other hand, if tube V3a is made non-conductive, the potential at the anode rises, thus raising the potential at the grid of tube V3b, and making the latter conductive. This in turn reduces the potential at the anode of tube V3b, and so depresses the potential on the grid of tube V3a, thus maintaining tube V3a non-conductive and tube V3b conductive. The circuit is stable in either condition, and is triggered from one condition to the other by the application of either a positive pulse or a negative pulse to the input terminal 58.

The anode of tube V3a is connected to the grid of control tube V5b through a lead 68 and resistor 66, and in similar or symmetrical fashion, the anode of tube V3b is connected through a lead 80 and resistor 82, to the grid of the control tube V6b. It will be evident that whenever trigger tube V3a is conductive, the control tube V5b is non-conductive, and the switch tube V5a is conductive. At such time the other trigger tube V3b is non-conductive; the control tube V6b is conductive; and the switch tube V6a is non-conductive. The output delivered at terminal 56 is in reversed-phase. When, however, such a pulse is supplied to the terminal 58 as to make the trigger tube V3a non-conductive, the other trigger tube V3b is made conductive. This makes the control tube V6b non-conductive and so makes the switch tube V6a conductive. At the same time the control tube V5b is made conductive and the switch tube V5a is made non-conductive. Thus the terminal 56 is supplied with in-phase detector output.

Figure 3:
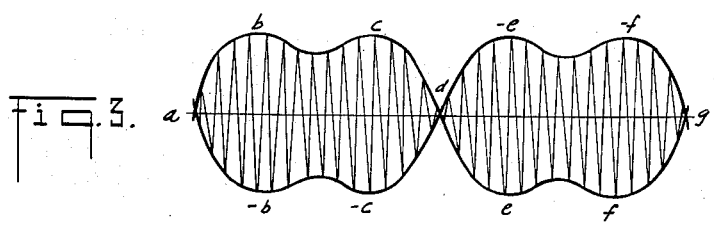
Fig. 3 shows the radio frequency wave after the carrier has been removed or suppressed.

Reverting now to Fig. 3, a detected output corresponding to the envelope of the carrier-suppressed wave will be delivered in one phase from the point a to the point d, and in opposite phase from the point d to the point g, and so on, thereby restoring the detected output to the original wave form shown in Fig. 1.

It will be seen that with every pulse a reversal of audio frequency phase is obtained. The speed of response of the triggering and switching tubes can be made high, and therefore the circuit is capable of handling even high audio frequencies.

The present invention may also be used for secrecy signalling. The underlying idea is to shift the frequency of the suppressed-carrier periodically, thereby shifting the average frequency of the entire wave and of the sidebands. These variations would not annoy the present receiver system if not too sudden, but conventional suppressed-carrier receivers would have great difficulty in following the transmitted signal.

A transmitter for this arrangement is schematically shown in Fig. 9, in which the low frequency signal or audio frequency is supplied at 100 and fed to the grids of tubes V7a and V7b in phase opposition or push-pull. The high frequency energy or carrier is supplied at 102, and the generator includes a resonant circuit 104, the tuning of which may be periodically varied by means of a supplemental condenser 106 rotated through appropriate reduction gearing by a motor 108. This energy is supplied to the tubes in parallel. The carrier is modulated by the audio frequency, but the carrier does not appear in the output circuit 110, because there the carrier components are opposed and neutralize one another. The sidebands are fed to an appropriate transmitting antenna system 112.

At the receiver it would be possible to vary the frequency of the local oscillator shown at 94 in Fig. 8 in conformance with the variation at the transmitter, thus delivering a constant intermediate frequency to the amplifier 20 in Fig. 4. It would also be possible to vary the tuning of the resonant circuits in the discriminator, or, in this case, the circuits 24 and 30 in Fig. 5. However, the simplest and preferred plan is to so arrange the triggering circuit at tubes V3a and V3b in Fig. 6 as to make the same non-responsive to the slow variations of carrier frequency, that is, the threshold of response is so adjusted that the circuit responds only to the sudden sharp pulses resulting from phase reversal at the time the double-sideband envelope crosses the zero axis, and does not respond to the gradual variations in frequency produced periodically, for example by the method in Fig. 9. Another advantage of so operating the receiver is that then the frequency changes at the transmitter need not be periodic, that is, the changes may be relatively irregular and unpredictable, thus increasing the difficulty of attempted interception by a suppressed-carrier receiver of conventional type.

In connection with the theory of operation of this invention it may be mentioned that the polarity of the pip or pulse derived from the frequency modulation detector depends solely upon which of the two almost equal tones is larger in amplitude. In accordance with presently accepted theory, if one of the tones were always larger than the other tone, the pulses or pips would all have the same polarity. The present apparatus is designed to reverse the output or amplitude-modulation detector polarity each time a pulse or pip occurs, without regard to the polarity of the pulse, thus taking care of all conditions which may arise.

It may also be explained that the system should not reverse the polarity of the output of the amplitude-modulation detector whenever the transmitted wave comes to zero. The only time when the polarity reversing switch should operate is when the radio frequency wave reverses its phase. As an extreme example one may consider the case where a series of positive going pulses is fed to a suppressed-carrier transmitter. It is readily seen that when this pulse wave is at zero the transmitted radio frequency wave would also be zero. However, in such a case the polarity of the output of the amplitude-modulation detector should not be reversed each time the pulse is absent, because then the receiver output would be a series of alternate positive and negative pulses instead of a series of positive pulses corresponding to the original positive pulses at the transmitter.

It should therefore be understood that a mere zero sensitive device would not successfully handle all types of modulation or audio signal, and it is for this reason that the apparatus is so designed as to respond to the instantaneous changes in frequency of the transmitted radio frequency wave and not merely the zero points of the transmitted radio frequency wave. In other words, it is desired to reverse the polarity reversing switch and the detector output controlled thereby when the transmitted radio frequency wave experiences a sudden phase reversal.

It is believed that the method and apparatus for the practice of my invention, as well as the advantages thereof, will be apparent from the foregoing detailed description. The carrier may be fully suppressed at the transmitter. There is no need for elaborate filters and amplifiers to exalt a small residual of carrier at the receiver. However, it should be understood that this new system is not restricted to use with a fully suppressed carrier, for it is equally useful with a radio wave in which there is a residual carrier, and indeed there may be a great deal of carrier present, as when the system is used with a transmitter which is not designed for carrier suppression, but in which there has been perhaps unintentional overmodulation which, if not corrected, would lead to distortion at the receiver.

The present system is less sensitive to jamming than the conventional filter methods of suppressed-carrier reception. With the conventional system it is only necessary to locate the jamming signal in the carrier channel, and thus seize control of the A. F. C. (automatic frequency control) and the A. V. C. (automatic volume control). Inasmuch as the carrier is quite weak in the conventional suppressed-carrier system, it is not at all difficult to jam the system. On the other hand, with my new system carrier amplification is not required, and therefore the system is not vulnerable to this form of jamming. My new system is also of value in connection with secrecy signalling.

It will be apparent that while I have shown and described my system in a preferred form, changes may be made in the circuits disclosed, without departing from the scope of the invention, as sought to be defined in the following claims. In the claims the term "transmitted wave" is intended to include an amplified replica, and also a derived wave, such as the intermediate frequency wave after heterodyning. The term "suppressed-carrier" is not intended to be limited to total suppression of the carrier, because the invention is also useful for receiving a transmitted wave in which the carrier has not been fully suppressed. Moreover, in ordinary practical transmitting systems there would be some small residual carrier even when total suppression is sought, because perfect balance of the transmitter circuit would not be achieved without extraordinary refinements in equipment or the use of auxiliary equipment.

I claim:

1. Apparatus for detecting an amplitude-modulated suppressed-carrier radio wave, said apparatus comprising a detector for rectifying the transmitted amplitude modulation sideband wave, means for generating a pulse each time the transmitted amplitude modulation sideband wave reverses in phase, and polarity reversing means following the detector and triggered by the aforesaid resulting pulses to receive and reverse the polarity of the signal or rectified output.

2. Apparatus for detecting an amplitude-modulated suppressed-carrier radio wave, said apparatus comprising a detector for detecting the transmitted amplitude modulation sideband wave, means for generating a pulse each time the modulating wave changes in polarity, and polarity reversing means following the detector and triggered by the aforesaid resulting pulses to receive and reverse the polarity of the detector or signal output, the reversed polarity being maintained until the next pulse is generated, and so on.

3. Apparatus for detecting a double-sideband of amplitude-modulated suppressed-carrier radio wave, said apparatus comprising a detector for detecting the transmitted amplitude modulation sidebands and thereby producing a distorted signal, means to generate a pulse each time the transmitted amplitude modulation sideband wave experiences an abrupt change in instantaneous frequency, and an electronic polarity reversing switch following the detector and responsive to the aforesaid resulting pulses to receive and reverse the phase of the detected or signal output in order to eliminate the distortion of the signal.

4. Apparatus for detecting an amplitude-modulated suppressed-carrier radio wave, said apparatus comprising a detector to detect the transmitted suppressed-carrier amplitude modulation sideband wave from a first zero point at which phase reversal of the transmitted wave occurs to a second such zero point to a third such zero point to a fourth such zero point to a fifth such zero point, and so on, and an additional electronic polarity reversing circuit following the detector for receiving and reversing the polarity of the resulting detected signal during the interval from said second to said third zero point, and during the interval from said fourth to said fifth zero point, but not during the interval from said first to said second zero point nor during the interval from said third to said fourth zero point, and so on.

5. Apparatus for detecting an amplitude-modulated suppressed-carrier radio wave, said apparatus comprising an amplitude-modulation detector, a circuit following said detector and having a connection for delivering a reversed phase output and also having a connection for delivering an in-phase output, an electron switch means to transmit either the reversed phase output or the in-phase output in alternation, a phase responsive network arranged in shunt with the aforesaid amplitude-modulation detector, said network comprising circuits and tubes arranged to deliver pulses on successive phase reversals, a triggering circuit comprising a pair of tubes with an associated network which is stable with either tube conducting and the other cut off, means for feeding said pulses to one of said triggering tubes to make the tube conductive and non-conductive in alternation, and means coupling said triggering circuit to operate the aforesaid switch means, whereby the detected amplitude-modulation output is reversed in phase each time said radio wave reverses in radio frequency phase.

6. Apparatus for detecting an amplitude-modulated suppressed-carrier radio wave, said apparatus comprising an amplitude-modulation detector, a circuit following said detector and having a connection for delivering a reversed phase output and also having a connection for delivering an in-phase output, an electron switch means to transmit either the reversed phase output or the in-phase output in alternation, a frequency modulation discriminator network arranged in shunt with the aforesaid amplitude-modulation detector, said network comprising a limiter arranged to limit both positive and negative half cycles of the applied input, resonant circuits and tubes arranged to deliver pulses on successive abrupt changes in instantaneous radio frequency, a triggering circuit comprising a pair of tubes with an associated network which is stable with either tube conducting and the other cut off, means for feeding said pulses to one of said triggering tubes to make the tube conductive and non-conductive in alternation, and means coupling said triggering circuit to operate the aforesaid switch means, whereby the detected amplitude-modulation output is reversed in phase each time said radio wave experiences an abrupt change in instantaneous radio frequency.

7. Apparatus for detecting an amplitude-modulated suppressed-carrier radio wave, said apparatus comprising an amplitude-modulation detector, a circuit following said detector and having a connection for delivering a reversed phase output and also having a connection for delivering an in-phase output, an electron switch means to transmit either the reversed phase output or the in-phase output in alternation, a responsive network arranged in shunt with the amplitude-modulation detector, said network comprising a pair of loosely coupled resonant circuits tuned to the carrier frequency, a low impedance connection from the high alternating potential side of the primary resonant circuit to an intermediate of the secondary resonant circuit, rectifiers connected to the opposite sides of the secondary resonant circuit, an output connection for combining the rectified outputs and thereby delivering pulses on successive phase reversals, a triggering circuit comprising a pair of tubes with an associated network which is stable with either tube conducting and the other cut off, means for feeding said pulses to the grid of one of said triggering tubes to make the tube conductive and non-conductive in alternation, and means coupling said triggering circuit to operate the aforesaid switch means, whereby the detected amplitude-modulation output is repeatedly reversed in phase.

8. Apparatus for detecting an amplitude-modulated suppressed-carrier radio wave, said apparatus comprising an amplitude-modulation detector, a circuit following said detector and having a connection for delivering a reversed phase output and also having a connection for delivering an in-phase output, an electron switch means to transmit either the reversed phase output or the in-phase output in alternation, a responsive network arranged in shunt with the amplitude-modulation detector, said network comprising a limiter arranged to limit both the positive and the negative half cycles of the applied input, a pair of loosely coupled resonant circuits tuned to the carrier frequency, a low impedance connection from the high alternating potential side of the primary resonant circuit to the mid-point of the secondary resonant circuit, rectifiers connected to the opposite sides of the secondary resonant circuit, an output connection for combining the rectified outputs and thereby delivering pulses on successive phase reversals, a triggering circuit comprising a pair of tubes with an associated network which is stable with either tube conducting and the other cut off, means for feeding said pulses to one of said triggering tubes to make the tube conductive and non-conductive in alternation, and means coupling said triggering circuit to operate the aforesaid switch means, whereby the detected amplitude-modulation output is repeatedly reversed in phase.

9. Apparatus for detecting an amplitude-modulated suppressed-carrier radio wave, said apparatus comprising an amplitude-modulation detector, an amplifier tube following said detector and having a plate connection for delivering a reversed phase output and also having a cathode-follower connection for delivering an in-phase output, an electron tube acting as a switch to transmit or cut off the reversed phase output, another electron tube acting as a switch to transmit or cut off the in-phase output, a circuit combining the outputs of said switch tubes, a phase responsive network arranged in shunt with the amplitude-modulation detector, said network comprising a pair of loosely coupled resonant circuits tuned to the carrier frequency, a low impedance connection from the high alternating potential side of the primary resonant circuit to the midpoint of the secondary resonant circuit, rectifiers connected to the opposite sides of the secondary resonant circuit, an output connection for combining the rectified outputs and thereby delivering pulses on successive phase reversals, a triggering circuit comprising a pair of tubes with an associated network which is stable with either tube conducting and the other cut off, means for feeding said pulses to one of said triggering tubes to make the tube conductive and non-conductive in alternation, means coupling one of said triggering tubes to one of the aforesaid switch tubes, and means coupling the other of said triggering tubes to the other of said switch tubes, whereby the detected amplitude-modulation output is reversed in phase each time said radio wave reverses in radio frequency phase.

10. Apparatus for detecting an amplitude-modulated suppressed-carrier radio wave, said apparatus comprising an amplitude-modulation detector, an amplifier tube following said detector and having a plate connection for delivering a reversed phase output and also having a cathode-follower connection for delivering an in-phase output, an electron tube acting as a switch to transmit or cut off the reversed phase output, another electron tube acting as a switch to transmit or cut off the in-phase output, a circuit combining the outputs of said switch tubes, a frequency modulation discriminator network arranged in shunt with the amplitude-modulation detector, said network comprising a limiter arranged to limit both positive and negative half cycles of the applied input, a pair of loosely coupled resonant circuits tuned to the carrier frequency, a blocking condenser connecting one side of the primary resonant circuit to the midpoint of the secondary resonant circuit, rectifiers connected to the opposite sides of the secondary resonant circuit, an output connection for combining the rectified outputs and thereby delivering pulses, a triggering circuit comprising a pair of tubes with an associated network which is stable with either tube conducting and the other cut off, means for feeding said pulses to the grid of one of said triggering tubes to make the tube conductive and non-conductive in alternation, means coupling one of said triggering tubes to one of the aforesaid switch tubes, and means coupling the other of said triggering tubes to the other of said switch tubes, whereby the detected amplitude-modulation output is reversed in phase each time said radio wave experiences abrupt changes in instantaneous radio frequency.

11. Apparatus for detecting an amplitude-modulated suppressed-carrier radio wave, said apparatus comprising an amplitude-modulation detector, an amplifier tube following said detector and having a plate connection for delivering a reversed-phase output and also having a cathode-follower connection for delivering an in-phase output, an electron tube acting as a switch to transmit or cut off the reversed-phase output, a companion tube having a common cathode resistor for making said switch tube conductive or non-conductive, another electron tube acting as a switch to transmit or cut off the in-phase output, a companion tube having a common cathode resistor for making said switch tube conductive or non-conductive, a circuit combining the outputs of said switch tubes, a phase responsive network arranged in shunt with the amplitude-modulation detector, said network comprising a pair of loosely coupled resonant circuits tuned to the carrier frequency, a blocking condenser connecting one side of the primary resonant circuit to the midpoint of the secondary resonant circuit, rectifiers connected to the opposite sides of the secondary resonant circuit, an output connection for combining the rectified outputs and thereby delivering pulses on successive phase reversals, a triggering circuit comprising a pair of tubes with an associated network which is stable with either tube conducting and the other cut off, means for feeding said pulses to one of said triggering tubes to make the tube conductive and non-conductive in alternation, means connecting the plate of one of said triggering tubes to the grid of one of the aforesaid switch controlling tubes, and means connecting the plate of the other of said triggering tubes to the grid of the other of said switch controlling tubes, whereby the detected amplitude modulation output is reversed in phase each time said radio wave reverses in radio frequency phase.

12. Apparatus for detecting an amplitude-modulated suppressed-carrier radio wave, said apparatus comprising an amplitude-modulation detector, an amplifier tube following said detector and having a plate connection for delivering a reversed-phase output and also having a cathode-follower connection for delivering an in-phase output, an electron tube acting as a switch to transmit or cut off the reversed-phase output, a companion tube having a common cathode resistor with said switch tube for making said switch tube conductive or non-conductive, another electron tube acting as a switch to transmit or cut off the in-phase output, a companion tube having a common cathode resistor with said second switch tube for making said switch tube conductive or non-conductive, a circuit combining the outputs of said switch tubes, a frequency modulation discriminator network arranged in shunt with the amplitude-modulation detector, said network comprising a limiter arranged to limit both the positive and negative half cycles of the applied input, a pair of loosely coupled resonant circuits tuned to the carrier frequency, a blocking condenser connecting one side of the primary resonant circuit to the midpoint of the secondary resonant circuit, rectifiers connected to the opposite sides of the secondary resonant circuit, an output connection for combining the rectified outputs and thereby delivering pulses, a triggering circuit comprising a pair of tubes with an associated network which is stable with either tube conducting and the other cut off, means for feeding said pulses to one of said triggering tubes to make the tube conductive and non-conductive in alternation, means connecting the plate of one of said triggering tubes to the grid of one of the aforesaid switch controlling tubes, and means connecting the plate of the other of said triggering tubes to the grid of the other of said switch controlling tubes, whereby the detected amplitude-modulation output is reversed in phase each time said radio wave experiences an abrupt change in instantaneous radio frequency.

13. A secrecy signalling system comprising a suppressed-carrier transmitter, means at said transmitter for varying the frequency of the suppressed carrier, and a suppressed-carrier receiver as defined in claim 2, whereby the operation of the receiver is independent of the changes in suppressed-carrier frequency.

14. A secrecy signalling system comprising a suppressed-carrier transmitter, means at said transmitter for varying the frequency of the suppressed carrier, and a suppressed-carrier receiver as defined in claim 5, whereby the operation of the receiver is independent of the changes in suppressed-carrier frequency.

References Cited in the file of this patent

UNITED STATES PATENTS

| | | |
|---|---|---|
| 1,708,518 | Peterson | Apr. 9, 1929 |
| 2,193,801 | Byrne | Mar. 19, 1940 |
| 2,207,048 | Campbell | July 9, 1940 |
| 2,226,459 | Bingley | Dec. 24, 1940 |
| 2,300,999 | Williams | Nov. 3, 1942 |
| 2,383,847 | Crosby | Aug. 28, 1945 |
| 2,388,052 | Hansell | Oct. 30, 1945 |
| 2,396,395 | Smith | Mar. 12, 1946 |
| 2,516,937 | Young | Aug. 1, 1950 |